R. L. MARTIN.
AUTOMOBILE BODY WITH TRAVELING AND HOUSEKEEPING CONVENIENCES.
APPLICATION FILED JULY 1, 1919.
1,392,955.
Patented Oct. 11, 1921.
5 SHEETS—SHEET 3.
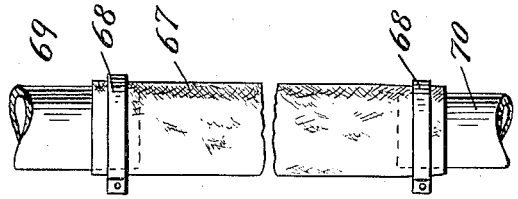
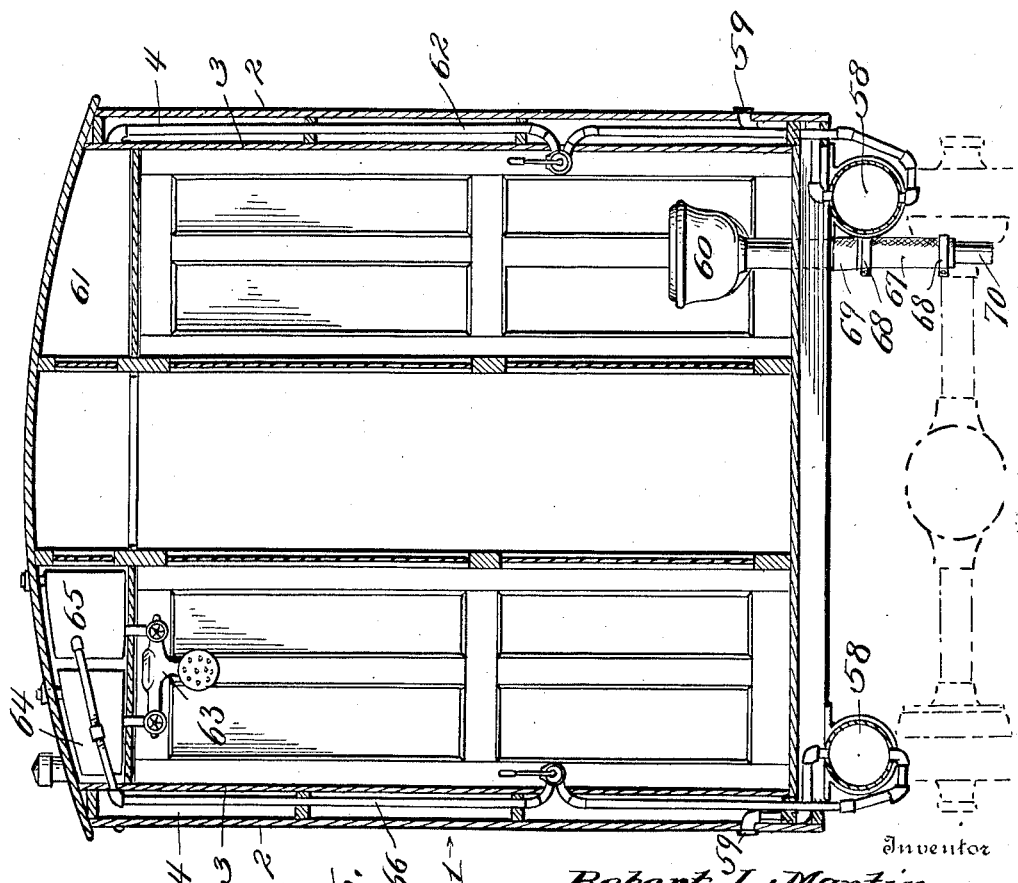
Witness
Inventor
Robert L. Martin
By
Attorney R. L. MARTIN.
AUTOMOBILE BODY WITH TRAVELING AND HOUSEKEEPING CONVENIENCES.
APPLICATION FILED JULY 1, 1919.
1,392,955.
Patented Oct. 11, 1921.
5 SHEETS—SHEET 4.
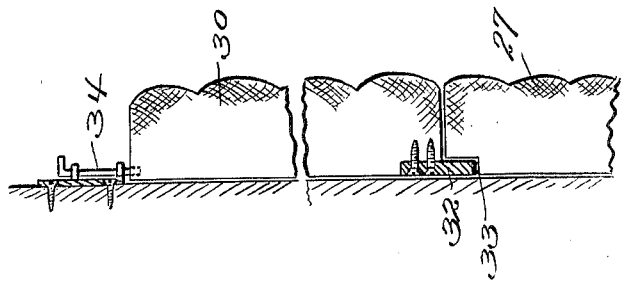
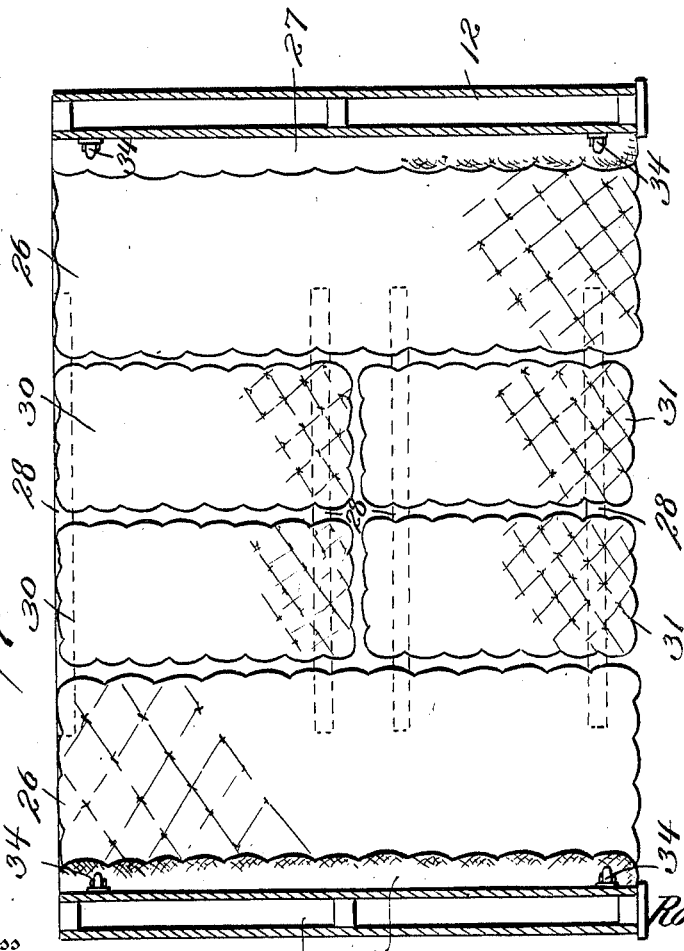

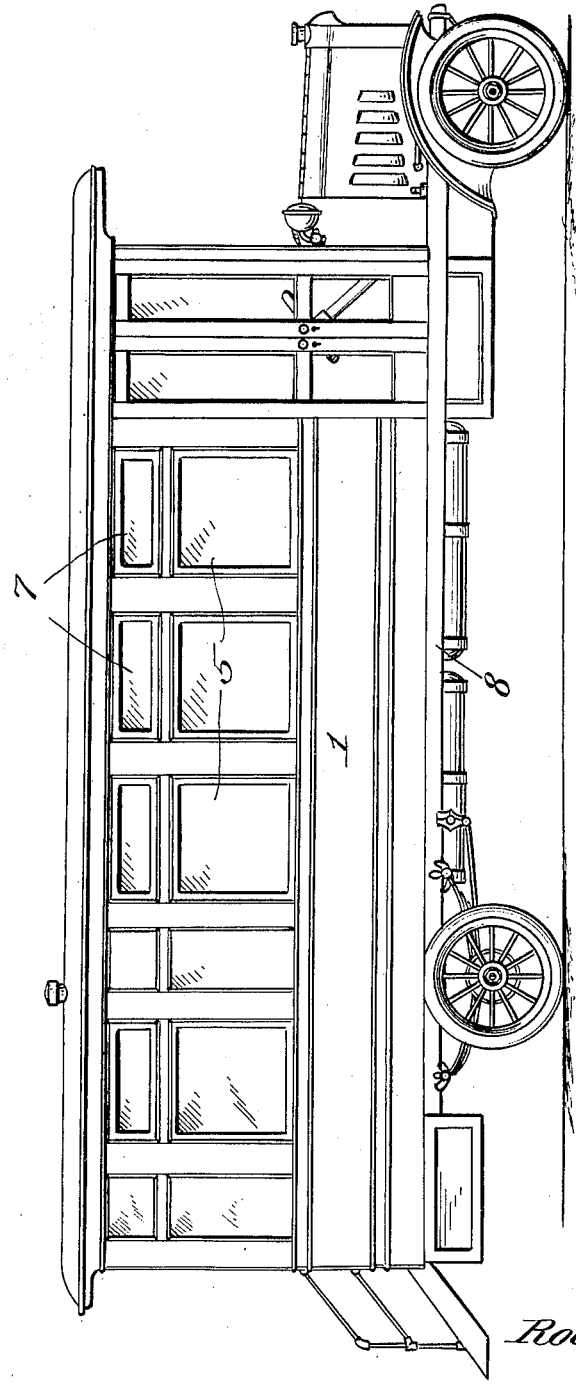

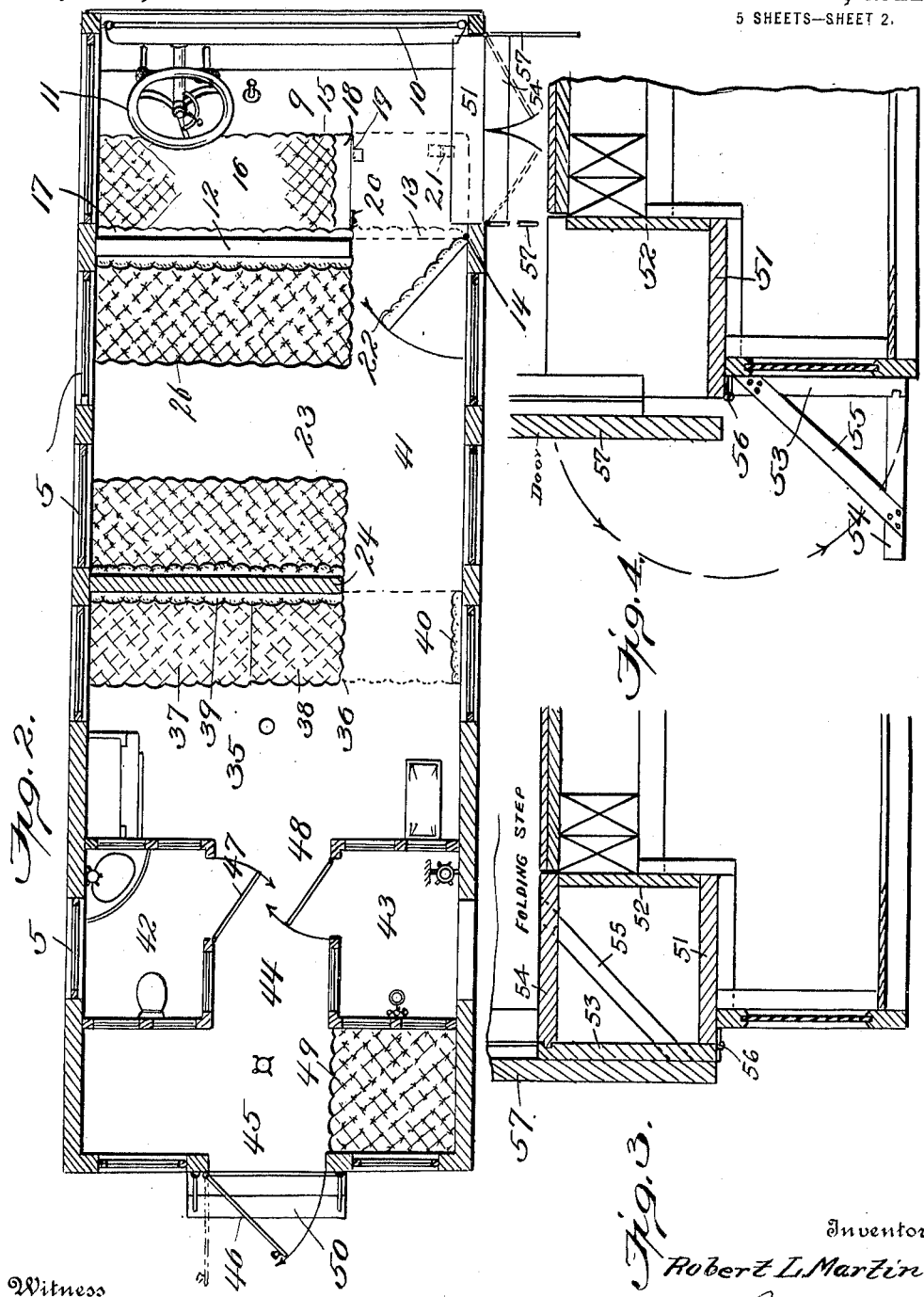

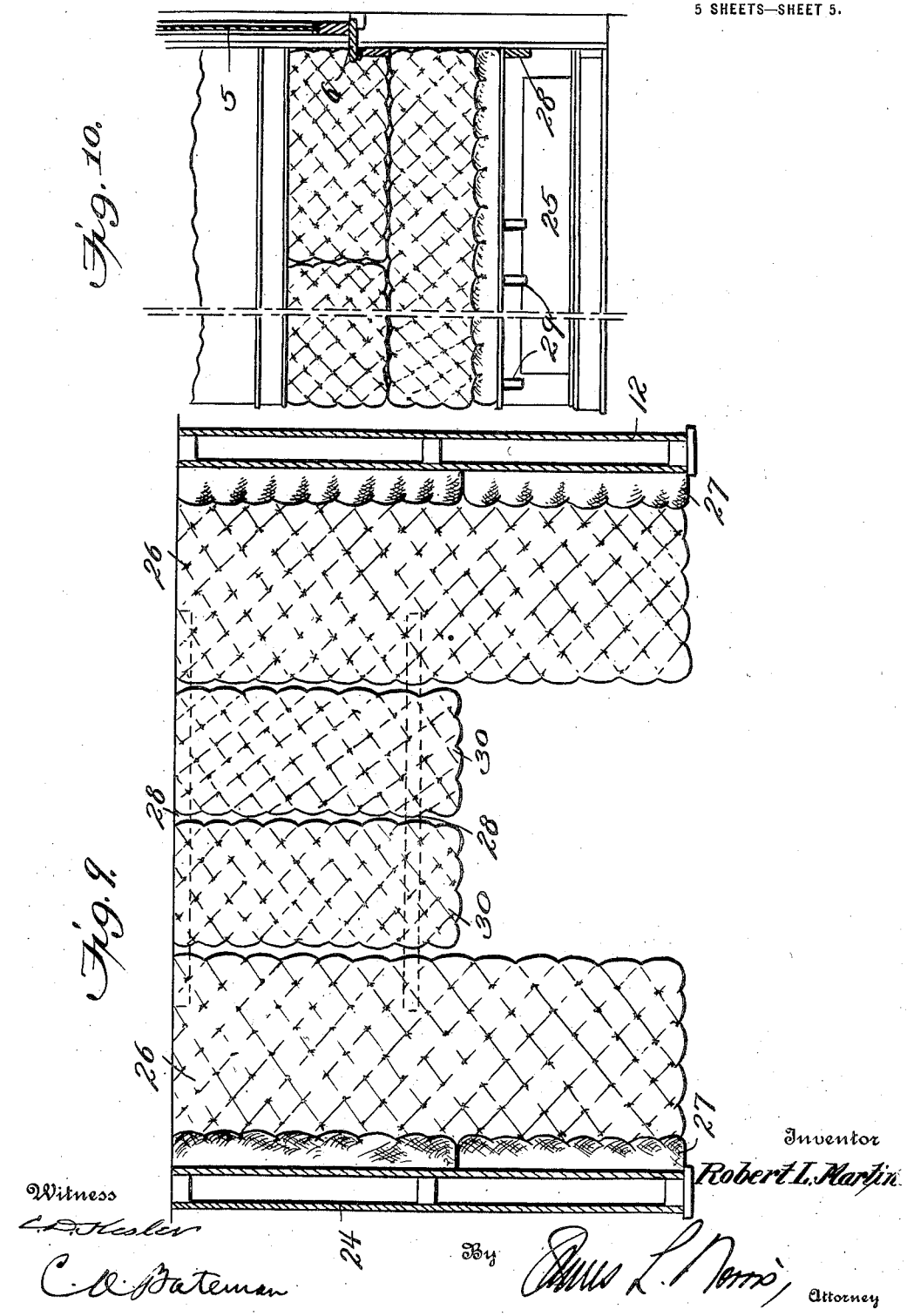

UNITED STATES PATENT OFFICE.

ROBERT L. MARTIN, OF OCALA, FLORIDA.

AUTOMOBILE-BODY WITH TRAVELING AND HOUSEKEEPING CONVENIENCES.

1,392,955.  Specification of Letters Patent.  Patented Oct. 11, 1921.

Application filed July 1, 1919. Serial No. 307,992.

*To all whom it may concern:*

Be it known that I, ROBERT L. MARTIN, a citizen of the United States, residing at Ocala, in the county of Marion and State of Florida, have invented new and useful Improvements in Automobile-Bodies with Traveling and Housekeeping Conveniences, of which the following is a specification.

My present invention relates to improvements in touring or traveling equipments and it pertains more particularly to an automobile body containing a novel construction and arrangement of traveling and housekeeping conveniences.

One of the primary objects of the invention is to provide a novel and improved arrangement of the traveling and housekeeping conveniences whereby all the necessary or desirable conveniences are accommodated within a vehicle body of moderate size and these conveniences are so located and arranged within the body that they are readily and easily accessible and they also enable a free passage-way to extend throughout the length of the body.

Another object of the invention is to provide novel and improved convertible bed and seat structures which when used as seats occupy a minimum space and when converted into beds provide full length and comfortable sleeping accommodations. A further object of the invention is to provide a novel and improved foldable step which when folded, does not project beyond the exterior of the body of the vehicle and hence is not subject to breakage by striking obstructions in the roadway and when unfolded or extended, it affords efficient means of entrance and exit for the occupants of the vehicle.

To these and other ends the invention consists in certain improvements and combinations and arrangements of parts all as will be hereinafter more fully described, the features of novelty being pointed out particularly in the claims at the end of the specification.

In the drawing—

Figure 1 is an exterior side elevation of an automobile body with traveling and housekeeping conveniences constructed in accordance with the present invention.

Fig. 2 represents a horizontal section through the automobile body illustrating the arrangement of the traveling and housekeeping conveniences therein.

Fig. 3 represents on an enlarged scale and in transverse section, the foldable or collapsible step in the side and at the front end of the body, the step being shown folded in this figure.

Fig. 4 is a view similar to Fig. 3 showing the step unfolded or extended and in condition for use.

Fig. 5 represents on an enlarged scale a transverse section through the body as shown in Fig. 2 and looking toward the rear.

Fig. 6 is a detail view showing a sewer connection for the hopper of the toilet.

Fig. 7 shows a detail view of the convertible bed and seat structures, the same being set up for use as a bed.

Fig. 8 represents a section taken vertically through one of the seat backs and also showing means for mounting the removable bed sections thereon.

Fig. 9 is a view similar to Fig. 7, but showing the bed and seat structure arranged to provide a composite bed and seat, a part of the structure being usable as a bed and the remaining part of such structure providing seats.

Fig. 10 represents a section taken transversely through one side of the body in a plane between the two seats of the convertible bed and seat structure, the removable bed sections being shown in place above the back of the seat.

Similar parts are designated by the same reference characters in the several views.

The present invention is applicable to all vehicles or portable structures where it is desirable or necessary to provide housekeeping and traveling conveniences. The invention is particularly applicable to automobiles in order to afford to the occupants thereof the facilities of housekeeping and traveling conveniences *en route* and to provide the occupants of the automobile with satisfactory living quarters or accommodations at the destination or at any other desired place. The preferred embodiment of the invention is shown in the accompanying drawing and will be hereinafter described. It is to be understood, however, that the invention is not restricted to the precise construction shown, as equivalent constructions are contemplated and will be included within the scope of the claims.

In the present instance, 1 designates generally the body of the automobile or vehicle, this body containing the traveling and housekeeping conveniences. The body may be constructed in different ways and of different materials although it is preferable to construct it of wood, the two side walls and rear wall having exterior siding 2 and an interior wall or paneling 3, the space 4 between the exterior siding and the interior wall providing for heat insulation and also serving to accommodate piping and storage spaces for the windows when the latter are open. Any suitable number of windows 5 may be provided for the side and rear walls, each window comprising the usual wooden frame containing a glass panel and each window is provided with a hinged sill 6 which when in its horizontal position, as shown in Fig. 10, serves to support its respective window in closed position but which when lifted enables the window to be lowered into the interior space in the side wall of the body. Transoms 7 are also provided in the side and rear walls of the body above the windows, these transoms being preferably hinged at their upper edges in order that they may be swung inwardly and thus serve as ventilators. The body, in the present instance, is mounted on an automobile chassis 8, the forward end of the body providing a compartment 9 for the chauffeur or driver, for which purpose the forward end of the body is fitted with a wind shield 10 which is preferably of the pivoted or ventilating type similar to that used upon automobiles. The steering wheel 11 and the motor controlling devices extend into the driver's compartment 9 and this driver's compartment also contains the necessary appliances for the operation and control of the vehicle. The driver's compartment is separated from the remainder of the vehicle by a partition 12 and a door 13. The partition 12 is fixed in place, it extending from one side wall of the vehicle across the body to a point near the opposite side of the body, sufficient space, however, being left between the end of the partition and the opposite side of the body to permit a person to pass therethrough. The door 13 serves to close the space between the inner ends of the partition 12 and the adjacent side of the body. Preferably, and as shown, this door is pivoted or hinged at 14 to the respective side of the body in order that it may swing either into a position in line with the partition 12, in which position it will close communication between the driver's compartment and the remainder of the body, or the door may also swing toward or against the side of the body to which it is pivoted or hinged, this providing a passage-way between the driver's compartment and the remainder of the body.

The driver's compartment preferably contains a seat which is convertible into a full length bed for the accommodation of the driver. As shown, it comprises a seat base 15 on which a suitable upholstered seat cushion 16 rests, a suitable upholstered back 17 which is permanently fixed to the forward side of the partition 12 and a hinged or pivoted section 18 which is pivoted or hinged along one of its edges as at 19 to the base 15 so that it may be swung into an upright position and held in such position by suitable fastening means 20, this being the normal position of the hinged section so that it will not obstruct communication between the driver's compartment and the rear portion of the body, and this pivoted or hinged section may be swung downwardly into a position in alinement with the seat cushion 16 or substantially so, the hinged section which is suitably upholstered then coöperating with the seat cushion 16 to provide a continuous and full length bed for the driver. The pivoted section may be supported in its horizontal position by a pendant leg 21 which is preferably pivoted at its upper end to the under side of the pivoted section, at the free end thereof in order that the leg may occupy a collapsed position against the bottom of the pivoted section 18 when the pivoted bed section is in upright position, thus avoiding any obstruction to a free passage-way between the driver's compartment and the rear portion of the body, and when the pivoted bed section is swung downwardly or into its horizontal position, the pivoted leg is swung downwardly, it coming to rest on the floor of the body, the outer or free end of the pivoted bed section being thereby supported in its lowered or horizontal position. The forward side of the door 13 is also suitably upholstered as at 22 in order to provide a cushion to conform with and constitute a continuation of the back cushion 17 of the seat. It will be understood that the door 13 will be provided with a suitable lock or fastening to retain it in its closed position.

A combination sleeping and living compartment 23 is provided in the body immediately in rear of the driver's compartment. This compartment 23 is divided off from the rear part of the body by a partition 24 which is parallel with and similar to the partition 12. This compartment 23 contains a convertible bed and seat structure which may be used wholly as a seat; it may be used wholly as a bed, and also it may be used part as a bed and part as a seat. Preferably, and as shown in Figs. 7 to 10, inclusive, this convertible structure comprises a pair of seat supports 25, which are preferably box-like, one of these seat supports being mounted on the floor adjacent to each of the partitions 12 and 24. A suitably upholstered cushion 26 is provided for the top of each seat support and also a suitably upholstered cushion 27 is mounted on each of the partitions 12 and 24 so as to extend upwardly from the respective seat cushions 26. Each seat cushion 26 and its coöperating back 27 provides a seat of double width, the seats facing one another as will be clear from Figs. 7 and 9. The means for converting the seats either wholly or partially into a bed comprises a suitable number of rails 28, four rails being preferably used, one of these rails being nailed or otherwise fixed permanently against the adjacent side of the body while the other rails 28 may fit slidably or telescopically into openings 29 formed in the respective seat bases 26. These rails, when placed in position to bridge the space between the seat, serve to support supplemental cushions 30 and 31 on the same level with the seat cushions 26 so that the entire space between the backs of the seats constitutes a bed surface of double width and of full length. Two supplemental cushions 30 of equal size are preferably used, the combined width of these two cushions substantially filling the space between the adjacent edges of the seat cushions 26 for a portion of the width of the seat cushions. These supplemental seat cushions 30 are adapted to rest on the rail 28 which is fixed to the adjacent side of the body and on the rail next adjacent thereto. When the two supplemental cushions 30 only are used as illustrated in Fig. 9, the structure is converted into a composite bed and seat, the side of the structure to which the supplemental cushions 30 are applied constituting a bed structure while the opposite side of the structure constitutes seating accommodations. The pair of supplemental cushions 31 when used, convert the structure entirely into a bed, these supplemental cushions being adapted to rest on the other two removable rails 28. The present invention provides means for conveniently storing the supplemental cushions 30 and 31 when these supplemental cushions are not in use. As shown, one of the supplemental cushions 30 and one of the supplemental cushions 31 are adapted to be mounted above each seat back 27 so as to form in effect a continuation of such seat back. For this purpose each supplemental seat cushion is provided along one edge with a projecting strip 32 which is suitably fixed to the respective supplemental cushion, and this projecting portion is adapted to engage in a recess 33 which is formed in the upper edge of the respective seat back 27 whereby the lower edge of each supplemental cushion will be secured in place against the partitions 12 or 24, as the case may be, and the upper edge of each supplemental cushion will be secured in place by suitable means such as a sliding bolt 34 mounted on the partition and having its lower end arranged to engage in a recess in the upper edge of the supplemental cushion. In this way the supplemental cushions when not in use are stored securely in place above the seat backs, and they constitute in effect upward continuations of the respective seat backs. It, of course, is to be understood that the pairs of supplemental cushions 30 and 31 are individually removable in order that they may be used for the purpose of converting the structure either partially or wholly into a bed. The structure when arranged for seating comprises two opposed seats between which a table may be placed, the occupants at the table being seated at opposite sides thereof, and on the two seat cushions 26. A collapsible table is preferably used, the table being fastened in any suitable way against the adjacent wall of the body when in use and being collapsed and suitably stored when not in use.

A compartment 35, adapted to serve as a kitchen is provided to the rear of the compartment 23. The front wall of this compartment 35 is formed by the partition 24 and this compartment may contain a kitchen cabinet, a stove, and other desirable culinary conveniences. A convertible bed and seat structure is also provided in this compartment at the rear side of the partition 24, the same comprising a box-like seat base 36 on which rest suitably upholstered cushions 37 and 38. A suitable upholstered back 39 is attached to the rear side of the partition 24. A supplemental cushion 40 is also provided, this cushion when not in use being attached to and stored against a side of the body, as shown in Fig. 2, but when it is desired to use the structure as a bed, this supplemental cushion is mounted to span the space between the edge of the cushion 38 and the adjacent side wall of the body, the supplemental cushion thus being in alinement with the cushions 37 and 38 and forming therewith a continuous bed surface of full length. An unobstructed hall or passage-way 41 extends from the driver's compartment 15 through the compartment 23 and to the compartment 35, this hall or passage-way providing convenient means of access to any of the compartments. In rear of the compartment 35 are povided a toilet compartment 42 at one side of the body, and a shower-bath compartment 43 at the opposite side of the compartment, the hall or passage-way 44 extending from the compartment 35 between the compartments 42 and 43, and to a rear compartment 45 in line with a rear door 46. The compartments 42 and 43 are shown provided with doors 47 and 48 which provide communication between the hall 44 and these respective compartments. The rear compartment 45, which extends across the width of the body provides a space in which three upholstered seat cushions 49 may be placed end to end to form a bed, these seat cushions when not used to form a bed being stacked in superposed relation as shown in Fig. 2, and thus forming a seat. Steps 50 are provided at the rear of the body to facilitate entrance to and exit from the rear door.

The present invention provides a novel and improved foldable or collapsible step for the side of the body at the front end thereof. As shown in Figs. 3 and 4, the step comprises a tread 51 which is fixed to and set in a recess formed in the floor and the adjacent side of the body, a riser 52 which is fixed in the body and extends upwardly from the inner edge of the tread 51, and a hinged or folding section comprising members 53 and 54 secured rigidly in right-angular relation by braces 55, the foldable section being hinged to the body at 56. The members 53 and 54 of the foldable section are so proportioned relatively to the riser and tread 52 and 51, respectively, of the stationary part of the step that when the step is folded, the member 53 of the foldable section is parallel with the riser 52 and the member 54 is parallel with the tread 51, and this member 54 of the foldable section will be flush with and will form a continuation of the floor of the body. While the foldable section of the step is folded, the doors 57 may close against the member 53 as shown in Fig. 3, the doors thus serving to retain the step in folded condition. When the doors 57 are open, the foldable section of the step may be swung downwardly into the position shown in Fig. 4, the member 53 of the foldable section then lying against the adjacent side of the body whereby the foldable section of the step is supported. The foldable step when extended provides means by which the passengers may easily enter and leave the body and when the step is folded or collapsed it is contained within the body and hence it is not likely to become damaged or broken off by striking obstructions along the road-way in transit.

Suitable water supply tanks 58 are preferably mounted under the body, these tanks being provided with filler pipes 59 from which water may be received from water service pipes or other suitable sources and discharge pipes lead from the tanks to the various appliances which require the use of water. As shown, water for the water closet hopper 60 may be supplied by gravity from a tank 61 located under the roof of the body, water being conducted to the tank 61 by the piping 62 and water for the shower bath 63 may be supplied from tanks 64 and 65 also located under the roof of the body, one tank to contain hot water and the other tank to contain cold water, the water being supplied to these tanks by piping 66. A sewer connection can be made between the water closet hopper 60 and a stationary sewer pipe where such is available by a rubber or other flexible hose 67 having clamps 68 for attaching its ends to the pipe 69 leading from the hopper and to the sewer pipe 70. Electric lights may be suitably arranged in the various compartments of the body, the electric current therefor being supplied conveniently from a storage battery and electric charging apparatus similar to that generally used upon automobiles.

Ample storage spaces are provided to accommodate various articles that the occupants may desire to carry with them. For example, the box-like seat bases afford spacious storage chambers for which purpose the seat sections on the seat bases may be hinged or otherwise made movable to permit access thereto, and package racks or baskets of wire or other suitable material may be fixed on the interior side walls of the body above the windows to contain relatively small articles. The necessary tools and accessories may be stored in the seat base of the driver's seat. It will be understood that the transverse partitions which subdivide the interior of the body into separate compartments may be fitted with transparent or translucent panels of glass or the like to aid in the interior illumination of the body. The cooking stove, which is preferably of a construction to receive its heat from the exhaust of the engine of the vehicle, is preferably accommodated in the box-like base for the seat in the kitchen compartment 35. Preferably the stove is located in this seat base beneath the seat section 38, the latter being removable in order to permit access to the stove.

What is claimed is:—

1. An automobile body having front and rear partitions extending transversely from one side of the body partially across to the opposite side thereof, said partitions subdividing the body into a front driver's compartment having a transversely extending seat therein, an intermediate living and sleeping compartment and a kitchen compartment in rear thereof each containing transversely extending seats, a hall extending along one side of the body past the ends of said partitions and seats to provide intercommunication between the different compartments, lavatory and bath compartments in rear of the kitchen compartment and extending partially across the body from the respective opposite sides thereof, forming a middle longitudinal hallway between them which communicates with the kitchen compartment, and a convertible seating and sleeping compartment, extending transversely across the body in rear of the lavatory and bath compartments and communicating with the middle hallway between the latter compartments.

2. In an automobile body having traveling and housekeeping conveniences, a transverse upright partition extending partially across the body from one side wall thereof, toward the opposite side wall, thus providing a driver's compartment in the front of the body with a passageway leading from such compartment rearwardly past the partition, a door controlling said passageway, a seat structure contained in said compartment and comprising a back fixed to the forward side of said partition and a seat section extending forwardly therefrom, and an extension pivotally connected to the end of the seat section adjacent to said passageway and adapted to occupy an upright position and also to occupy a substantially horizontal position to form a continuation of said seat section, the latter and said extension thus providing a bed surface, the door when closed being in alinement with the partition to form a back for said extension.

3. In an automobile body, a convertible seat and bed structure comprising a pair of upright supports, immovably mounted, full-length seat sections extending toward one another from the respective supports forming a space between their adjacent edges, full-length back sections immovably secured to the upright supports, supporting rails adapted to bridge said space, and pairs of supplemental half length sections one or both of which pairs may be placed in said space and on said rails to partially or wholly fill the length of said space and thus partially or wholly convert the structure from a seat into a bed.

4. In an automobile body, a convertible seat and bed structure comprising a pair of upright supports, immovably mounted, full-length seat sections extending toward one another from the respective supports, permanent full-length back sections fixed to the supports adjacent to the respective seat sections, rails adapted to bridge the space between the seat sections, supplemental half-length sections adapted to fit in the space between the seat sections and to rest on said rails to either partially or wholly fill the length of said space, said supplemental sections being also adapted to fit against the upright supports above the respective back sections, and means for detachably securing the supplemental sections in said latter position.

5. In an automobile body, a convertible seat and bed structure comprising opposite upright supports, immovably mounted, full-length seat sections extending toward one another from the respective supports, permanent full-length back sections fixed to the supports above and adjacent to the respective seat sections, the upper edges of the back sections having recesses therein, supplemental half-length sections adapted to fit into and bridge the space between the seat sections either partially or wholly throughout the length of said space and also adapted to fit against the respective supports above the back sections thereon, said supplemental sections having projecting portions to engage in said recesses in the respective permanent back sections, and devices attached to the respective supports and coöperative with the supplemental sections to individually retain them in position on the respective supports.

6. The combination with a vehicle body having a floor and a depression in said floor adjacent to one side of the body, said depression having a horizontal tread member forming its bottom and an upright riser forming its inner wall, of a foldable step section comprising a tread member and a riser member, said members being connected rigidly and the upper edge of the riser of the foldable section being pivoted at the forward edge of the tread member in the body, the foldable section being capable of swinging into a position where its tread member forms a continuation of the floor to cover the opening therein.

7. The combination of a vehicle body having a step formed in the floor thereof adjacent to the side of the body, an extension step foldable into the depression formed by said step in the body, the foldable step then serving to cover the step in the body, and a door attached to the body and operating, when closed, to retain the extension step in folded position.

8. The combination of a vehicle body having a step formed in one edge of its floor adjacent to a side of the body, and an extension step foldably related to the step in the body and comprising a tread member and a riser member rigidly connected thereto, the tread member forming a continuation of the floor of the body when the extension step is folded and the riser of the extension step forming a continuation of the adjacent side of the body, and a door on the body arranged to close against the riser member of the extension step when the latter is folded and thus retain the foldable step in folded position.

9. An automobile body having traveling and housekeeping conveniences including a toilet having an outlet pipe projecting below the floor of the body, and a flexible pipe adapted to be fitted to said toilet outlet and to a sewer connection.

In testimony whereof I have hereunto set my hand in presence of two subscribing witnesses.

ROBERT L. MARTIN.

Witnesses:
A. E. GERIG,
D. A. PILLANS.